United States Patent
Evans et al.

(10) Patent No.: US 8,625,997 B2
(45) Date of Patent: *Jan. 7, 2014

(54) METHOD AND APPARATUS FOR LOCAL OPTIMIZATION OF AN OPTICAL TRANSMITTER

(75) Inventors: Peter W. Evans, Mountain House, CA (US); Alan C. Nilsson, Mountain View, CA (US)

(73) Assignee: Infinera Corporation, Sunnyvale, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/981,814

(22) Filed: Dec. 30, 2010

(65) Prior Publication Data

US 2012/0170931 A1  Jul. 5, 2012

(51) Int. Cl.
*H04B 10/00* (2013.01)
(52) U.S. Cl.
USPC ............. 398/162; 398/158; 398/140; 398/45; 398/48
(58) Field of Classification Search
USPC ............. 398/45, 48, 140, 139, 135, 1–7, 202, 398/162, 158
See application file for complete search history.

(56) References Cited

U.S. PATENT DOCUMENTS

| | | | | |
|---|---|---|---|---|
| 5,194,977 A * | 3/1993 | Nishio | | 398/48 |
| 6,404,527 B1 * | 6/2002 | Jensen | | 398/177 |
| 7,058,098 B1 * | 6/2006 | Shay | | 372/29.016 |
| 7,123,405 B2 * | 10/2006 | Yokoyama et al. | | 359/341.2 |
| 7,130,055 B2 * | 10/2006 | Borden et al. | | 356/491 |
| 7,881,608 B2 * | 2/2011 | Miller et al. | | 398/25 |
| 7,986,878 B2 * | 7/2011 | Saunders et al. | | 398/26 |
| 8,184,992 B2 * | 5/2012 | Kikuchi | | 398/202 |
| 8,233,798 B2 * | 7/2012 | Levinson | | 398/68 |
| 8,306,431 B2 * | 11/2012 | Takahara | | 398/152 |
| 8,422,121 B2 * | 4/2013 | Itoh et al. | | 359/337.13 |
| 8,463,142 B2 * | 6/2013 | Zhao et al. | | 398/204 |
| 2003/0194233 A1 * | 10/2003 | Casanova et al. | | 398/2 |
| 2004/0096214 A1 * | 5/2004 | Morreale et al. | | 398/33 |
| 2004/0208616 A1 * | 10/2004 | Melendez et al. | | 398/156 |
| 2009/0080892 A1 * | 3/2009 | Chang et al. | | 398/79 |
| 2010/0150547 A1 * | 6/2010 | Xia et al. | | 398/13 |
| 2010/0209113 A1 * | 8/2010 | Nagaki et al. | | 398/140 |
| 2012/0148235 A1 * | 6/2012 | Nishihara et al. | | 398/29 |
| 2012/0170938 A1 * | 7/2012 | Evans et al. | | 398/91 |

* cited by examiner

*Primary Examiner* — Daniel Washburn
*Assistant Examiner* — Hibret Woldekidan
(74) *Attorney, Agent, or Firm* — David L. Soltz

(57) ABSTRACT

Consistent with the present disclosure, an optical receiver is paired with an optical transmitter in a transceiver card or module, for example. During normal operation, the optical transmitter supplies optical signals for downstream transmission on a first optical communication path, and the optical receiver receives additional optical signals from a second optical communication path. During a transmitter monitoring mode (or "loopback"), however, when monitoring of transmitter parameters is desired, an optical switch directs the output or portion thereof from the transmitter to the receiver. The receiver may then supply monitoring data or information to a control or processor circuit, which, in turn, may supply control signals to the transmitter. In response to such control signals, the performance of the transmitter may be optimized, for example, by reducing BER and/or OSNR to a desired level. The switch is then configured to block transmission of the transmitter output or portion and normal operation is commenced. Thus, consistent with the present disclosure, an optical receiver is provided to detect optical signals inbound on one optical communication path during normal operation is also used to receive optical signals directly from the transmitter during the monitoring mode. Accordingly, a dedicated monitoring receiver is not required and the system is rendered less expensive, power consumption may be minimized and space may be conserved.

10 Claims, 14 Drawing Sheets

METHOD AND APPARATUS FOR LOCAL OPTIMIZATION OF AN OPTICAL TRANSMITTER

BACKGROUND

Optical communication systems are known in which an optical transmitter transmits an optical signal on an optical communication path to a downstream optical receiver. The optical signal is often modulated to carry information to the receiver that is often spaced from the transmitter by tens or hundreds of kilometers. The optical communication path typically includes one or more segments of optical fiber and various nodes, such as optical amplifier nodes and reconfigurable optical add/drop (ROADM) nodes.

The performance of the optical transmitter may be monitored by detecting various parameters, such as the optical signal-to-noise ratio (OSNR) and bit error rate (BER) of the optical signal. When these parameters, for example, are at desired levels, the performance of the optical transmitter may be considered optimized. If the optical transmitter does not transmit at an acceptable baseline performance level and the BER and OSNR are not at minimally acceptable levels, for example, during system start-up, tuning of the wavelength of light output from the optical transmitter, optimal performance may be difficult to adjust to the optimal level based on optical signals monitored at a distant receiver. In particular, when monitoring the optical signal at a remote receiver, impairments due to transmission through the optical communication path, e.g., through fiber, optical amplifiers and OADMs, may be difficult to distinguish from impairments due to faults associated with the optical transmitter itself. Distinguishing between the two classes of impairments is further made difficult in systems including photonic integrated circuits that supply optical signals having different wavelengths. Identifying the source of impairments is also difficult in systems in which the optical signals are modulated in accordance with advanced modulation formats, such as quadrature phase shift-keying (QPSK).

So-called intradyne coherent optical systems are known that include receivers having known digital signal processing circuits that operate in accordance with known algorithms to demodulate a received signal, apply error correction, and determine various characteristics of the optical signal. In order to monitor to thereby adjust parameters of an optical transmitter in such systems for optimal performance, a dedicated receiver may be provided locally, near the transmitter, to thereby directly monitor the optical signals prior to transmission along the optical communication path. As a result, so-called back-to-back BER measurements, for example, can be obtained directly proximate to the output of the optical transmitter, and such measurements are free of distortions or impairments related to the optical communication path.

Although accurate measurements indicative of the performance of the transmitter itself may be obtained with a dedicated receiver, the cost, power consumption and physical space required for the dedicated receiver are often prohibitive. Accordingly, there is a need for an efficient and inexpensive method and apparatus for locally monitoring the performance of an optical transmitter, such as an optical transmitter in a coherent optical communication system.

SUMMARY

Consistent with an aspect of the present disclosure, an apparatus is provided that comprises a first optical transmitter that transmits a first optical signal. An optical tap is also provided that has an input that receives the first optical signal, and first and second outputs. The first output of the optical tap supplies a first portion of the first optical signal to a first optical communication path and the second output supplies a second portion of the first optical signal. An optical component is further provided that has an input and an output. The input of the optical component receives the second portion of the first optical signal and the optical component selectively supplies the second portion of the first optical signal to the output of the optical component. In addition, an optical combiner is provided that has first and second inputs and an output. The first input of the optical combiner is coupled to a second optical communication path. Moreover, an optical receiver is provided that is configured to receive the second portion of the first optical signal via the optical component and the optical combiner when the optical component selectively supplies the second portion of the first optical signal to the output of the optical component. Further, a second optical transmitter is provided that transmits a second optical signal, which is supplied to the first input of the optical combiner via the second optical communication path, such that the output of the optical combiner supplies the second optical signal to the optical receiver when the optical component does not selectively supply the second portion of the optical signal to the output of the optical component.

Consistent with an additional aspect of the present disclosure, a method is provided that comprises the steps of transmitting a first optical signal from a first optical transmitter, and supplying a first portion of the first optical signal to a first optical communication path and supplying a second portion of the first optical to an optical component. In addition, the method includes outputting the second portion of the first optical signal from the output of the optical component to an optical receiver during a first time interval, and supplying a second optical signal to an optical receiver during a second time interval, wherein the second portion of the first optical signal is blocked by the optical component and not supplied to the optical receiver during the second time interval.

Consistent with a further aspect of the present disclosure, an apparatus is provided that comprises a first optical transmitter that transmits a first optical signal. The apparatus also includes a first optical receiver and a first optical tap, which has an input that receives the first optical signal, and first and second outputs. The first output supplies a first portion of the first optical signal to a first optical communication path and the second output supplies a second portion of the first optical signal. A second optical transmitter is also provided that transmits a second optical signal. The apparatus further includes a second optical receiver and a second optical tap, which has an input that receives the second optical signal, and first and second outputs. The first output of the second optical tap supplies a first portion of the second optical signal to a second optical communication path and the second output of the second optical tap supplies a second portion of the second optical signal. Moreover, the apparatus includes a first optical switch having first and second inputs and an output. The first input of the first optical switch is coupled to the first optical communication path, and the second input of the first optical switch is configured to receive the second portion of the second optical signal from the second optical tap, such that the second portion of the second optical signal is selectively supplied from the output of the first optical switch to the first optical receiver. Also, the apparatus includes a second optical switch having first and second inputs and an output. The first input of the second optical switch is coupled to the second optical communication path, and the second input of the second optical switch is configured to receive the second portion of the first optical signal from the first optical tap, such that the second portion of the first optical signal is selectively supplied from the output of the second optical switch to the second optical receiver.

Consistent with another aspect of the present disclosure, an apparatus is provided that comprises a first optical transmitter transmitting a first optical signal. An optical tap is also provided that has an input for receiving the first optical signal, and first and second outputs. The first output supplies a first portion of the first optical signal to a first optical communication path and the second output supplies a second portion of the first optical signal. In addition, an optical component is provided that has first and second inputs and an output. The first input of the optical component receives the second portion of the first optical signal and the output of the optical components is coupled to a second optical communication path. The optical component selectively supplies the second portion of the first optical signal to the output of the optical component, and the second input of the optical component is coupled to a second optical communication path. Also, an optical receiver is provided that is configured to receive the second portion of the first optical signal from the output of the optical component when the optical component supplies the second portion of the first optical signal to the output of the optical component. A second optical transmitter is further provided that supplies the second optical signal to a second optical communication path. The second optical signal being supplied to the second input of the optical component via the second optical communication path, such that the output of the optical component supplies the second optical signal to the optical receiver when the optical component does not supply the second portion of the optical signal to the output of the optical component.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure.

DESCRIPTION OF THE EMBODIMENTS

Consistent with the present disclosure, an optical receiver is paired with an optical transmitter in a transceiver card or module, for example. During normal operation, the optical transmitter supplies optical signals for downstream transmission on a first optical communication path, and the optical receiver receives additional optical signals from a second optical communication path. During a transmitter monitoring mode (or "loopback"), however, when monitoring of transmitter parameters is desired, an optical switch directs the output or portion thereof from the transmitter to the receiver. The receiver may then supply monitoring data or information to a control or processor circuit, which, in turn, may supply control signals to the transmitter. In response to such control signals, the performance of the transmitter may be optimized, for example, by reducing BER and/or increasing OSNR to a desired level. The switch is then configured to block transmission of the transmitter output or portion thereof to the local receiver, and normal operation is commenced. Thus, consistent with the present disclosure, an optical receiver is provided to detect optical signals inbound on one optical communication path during normal operation and is also used to receive optical signals directly from the local transmitter during the monitoring mode. Accordingly, a dedicated monitoring receiver is not required and the system is rendered less expensive, power consumption may be minimized and space may be conserved.

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
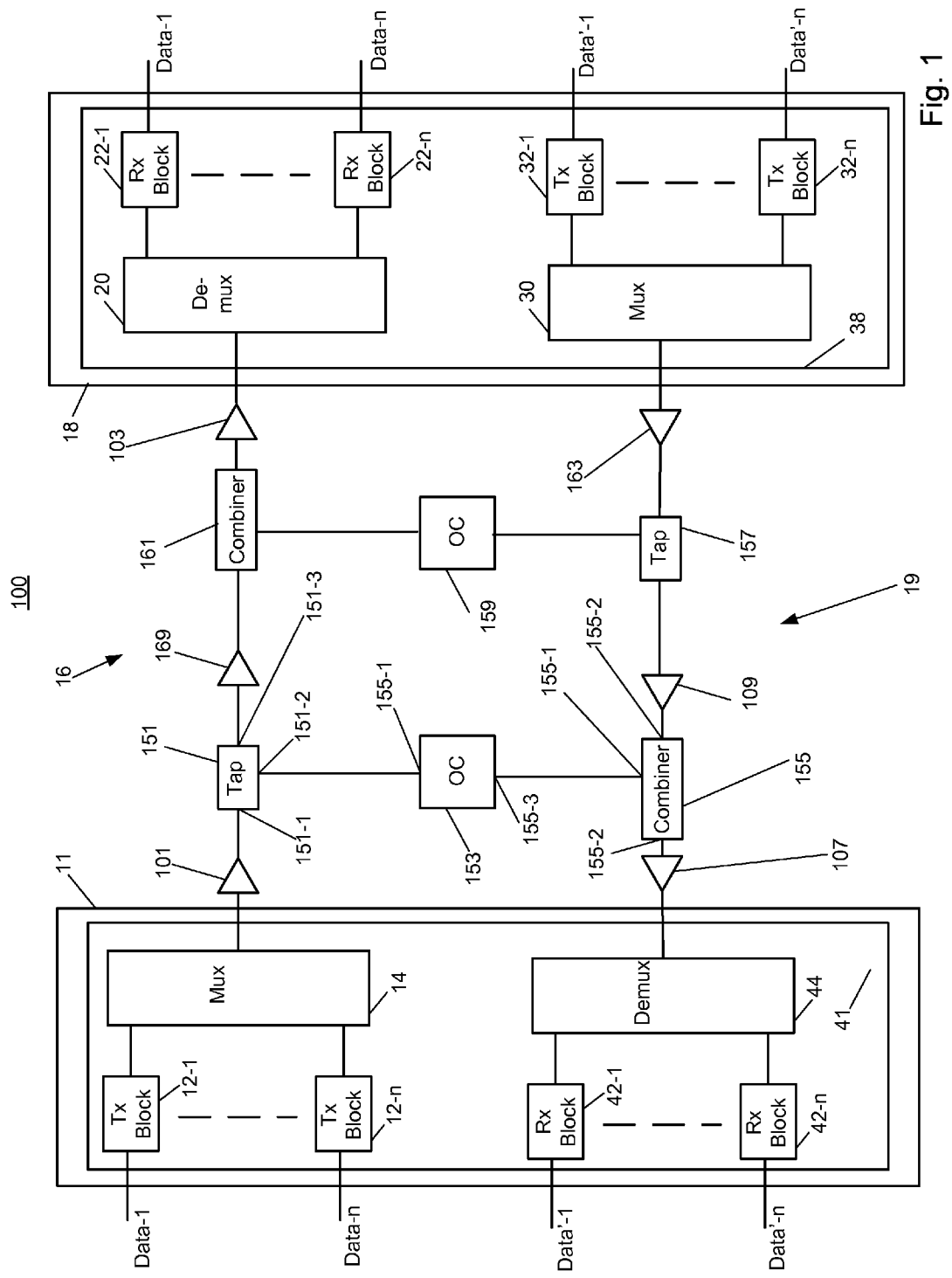
FIG. 1 illustrates a block diagram of an optical communication system consistent with an aspect of the present disclosure.

FIG. 1 illustrates an optical communication system 100 consistent with an aspect of the present disclosure. Communication system 100 includes a first rack, cabinet, chassis, or housing 11, which has a card or blade 41. Card 41 includes a plurality of transmitter blocks (Tx Block) 12-1 to 12-n, each of which receives a corresponding one of a plurality of data or information streams Data-1 to Data-n, and, in response to a respective one of these data streams, each of transmitter blocks 12-1 to 12-n may output a group of optical signals or channels to a combiner or multiplexer 14. Each optical signal carries an information stream or data corresponding to each of data streams Data-1 to Data-n. In particular, each optical signal may carry a series of symbols constituting an information signal. Multiplexer 14, which may include one or more optical filters, for example, combines each group of optical signals onto optical communication path 16 to provide a wavelength division multiplexed (WDM) optical signal. As used herein, an optical signal may refer to the WDM optical signal, as well as each optical signal included in the WDM optical signal.

Optical communication path 16 may include one or more segments of optical fiber and optical amplifiers 101, 169, and 103, for example, to optically amplify or boost the power of the transmitted optical signals. In one example, optical signals output from transmitter block 12-1 to 12-n may be polarization multiplexed optical signals that are modulated in accordance with a known modulation format, such as quadrature phase shift keying (QPSK), binary phase shift keying (BPSK) or combinations of such modulation formats, e.g., certain optical signals may have a first modulation format, while others have a second, different modulation format.

As further shown in FIG. 1, a receive node is provided that includes a second rack, cabinet, chassis, or housing 18, which has a card or blade 38. An optical combiner or demultiplexer 20 provided on card 38 may include one or more optical filters, for example, and supply each group of received optical signals to a corresponding one of receiver blocks (Rx Blocks) 22-1 to 22-$n$. Each of receiver blocks 22-1 to 22-$n$, in turn, supplies a corresponding copy of data or information streams Data-1 to Data-n in response to the optical signals. It is understood that each of transmitter blocks 12-1 to 12-$n$ may have the same or similar structure and each of receiver blocks 22-1 to 22-$n$ may have the same or similar structure.

Figure 2:
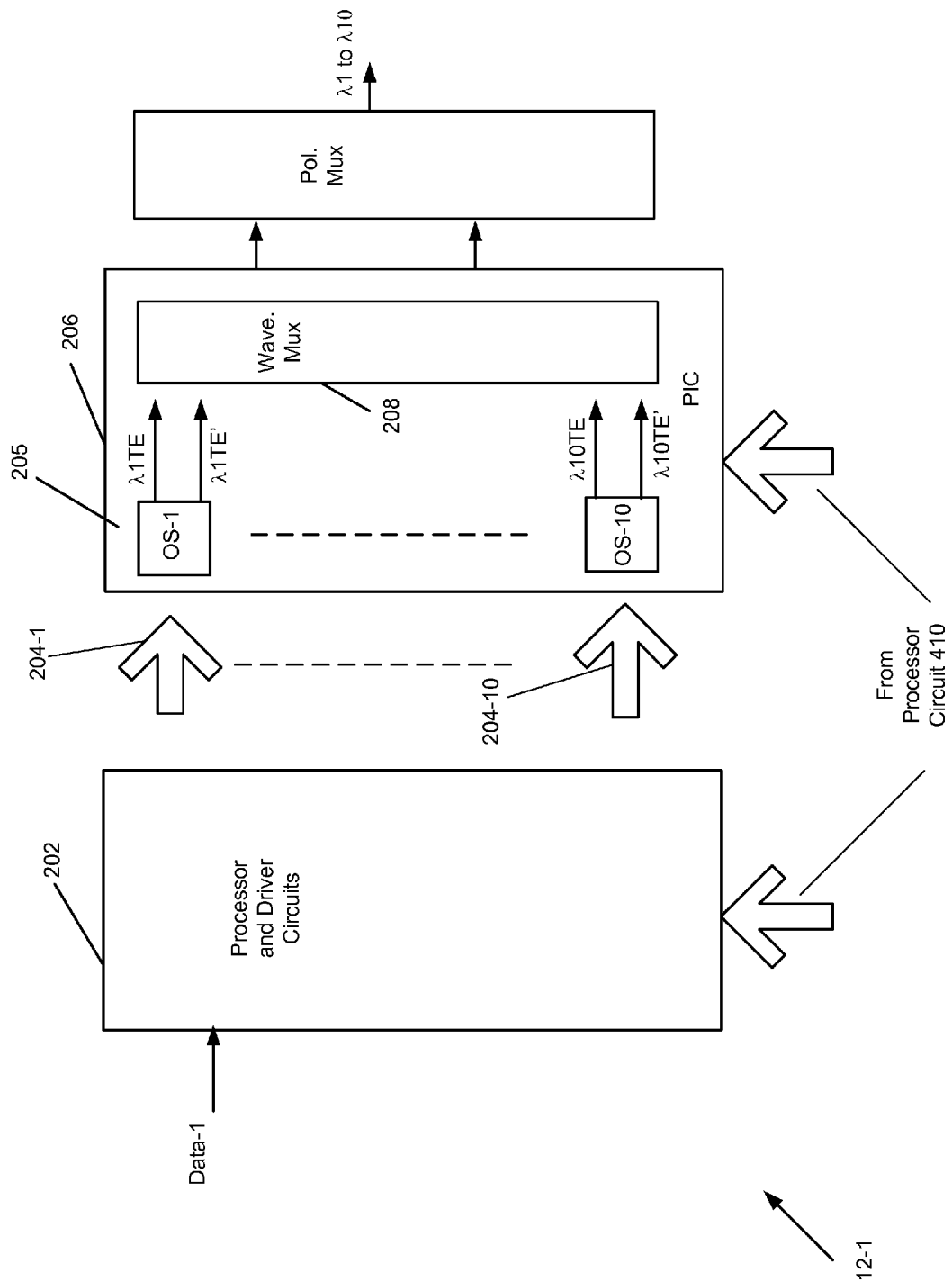
FIG. 2 illustrates a transmitter block consistent with an aspect of the present disclosure.

One of transmitter blocks 12-1 is shown in greater detail in FIG. 2. It is understood that remaining receiver circuitry or blocks 12-2 to 12-$n$ have the same or similar structure as transmitter block 12-1. Transmitter block 12-1 may include processor (such as a digital signal processor or DSP) and driver circuits 202, that receives, for example, a corresponding portion of Data-1. Circuitry 202, in turn, supplies corresponding outputs or electrical drive signal groupings 204-1 to 204-10 to optical sources or transmitter circuits OS-1 to OS-10 provided on transmit photonic integrated circuit (PIC) 205.

As further shown in FIG. 2, each of optical sources OS-1 to OS-10 supplies a corresponding pair of modulated optical signals (for example, a respective one of pairs $\lambda$1TE, $\lambda$1TE' ... $\lambda$10TE, $\lambda$10TE') to wavelength multiplexing circuitry 208. Typically, each optical signal within a given pair has the same or substantially the same wavelength, e.g., each of optical signals $\lambda$1TE, $\lambda$1TE' have wavelength $\lambda$1. In one example, each of optical signals $\lambda$1TE to $\lambda$10TE are multiplexed by wavelength multiplexing circuitry 208 into a first WDM output 290 and each of optical signals $\lambda$1TE' to $\lambda$10TE' are multiplexed into a second WDM output 291. Wavelength multiplexing circuitry 208 may include one or more arrayed waveguide gratings (AWGs) and/or one or more power combiners. Optical sources OS-1 to OS-10 and wavelength multiplexing circuitry 208 may be provided on substrate 205, for example. Substrate 205 may include indium phosphide or other semiconductor materials.

As further shown in FIG. 2, the first (290) and second (291) WDM outputs may be provided to polarization multiplexing circuitry 295, including for example a polarization beam combiner. In one example, first WDM output 290 may have a transverse electric (TE) polarization and is supplied to a polarization beam combiner by polarization maintaining optical fiber, such that the polarization of each optical signal in the first WDM output has the TE polarization upon input to polarization multiplexing circuitry 295. The second WDM output 291 may also have a TE polarization when output from wavelength multiplexer 208, but the second WDM output 291 may be provided to a second polarization maintaining fiber that is twisted in such a way that the polarization of each optical signal in the second WDM output 291 is rotated, for example, by 90 degrees. Accordingly, each such optical signal may have a transverse magnetic (TM) polarization when supplied to polarization multiplexing circuitry 295. Polarization multiplexing circuitry 295, in turn, combines the two WDM optical outputs to provide a polarization multiplexed WDM optical signal 296. Each optical signal wavelength associated with the WDM optical signal output from housing 11 onto first optical communication path 16 may equal or substantially equal a corresponding optical signal wavelength associated with the WDM optical signal output from housing 18 onto second optical communication path 19. Alternatively, each optical signal wavelength assocaited with the WDM optical signal output from housing 11 onto first optical communication path 16 may differ from each optical signal wavelength associated with the WDm optical signal output from housing 18 onto optical communication path 19.

Although FIG. 2 illustrates ten optical sources OS1-1 to OS-10, it is understood that any appropriate number of such circuit blocks and optical sources may be provided. Moreover, it is understood, that optical sources OS-1 to OS-10, as well as wavelength multiplexing circuitry, wavelength multiplexer or wavelength combiner 208, may be provided as discrete components, as opposed to being integrated onto substrate 205, such as PIC 206. Alternatively, selected components may be provided on a first substrate while others may be provided on one or more additional substrates in a hybrid scheme in which the components are neither integrated onto one substrate nor provided as discrete devices.

Figure 3A:
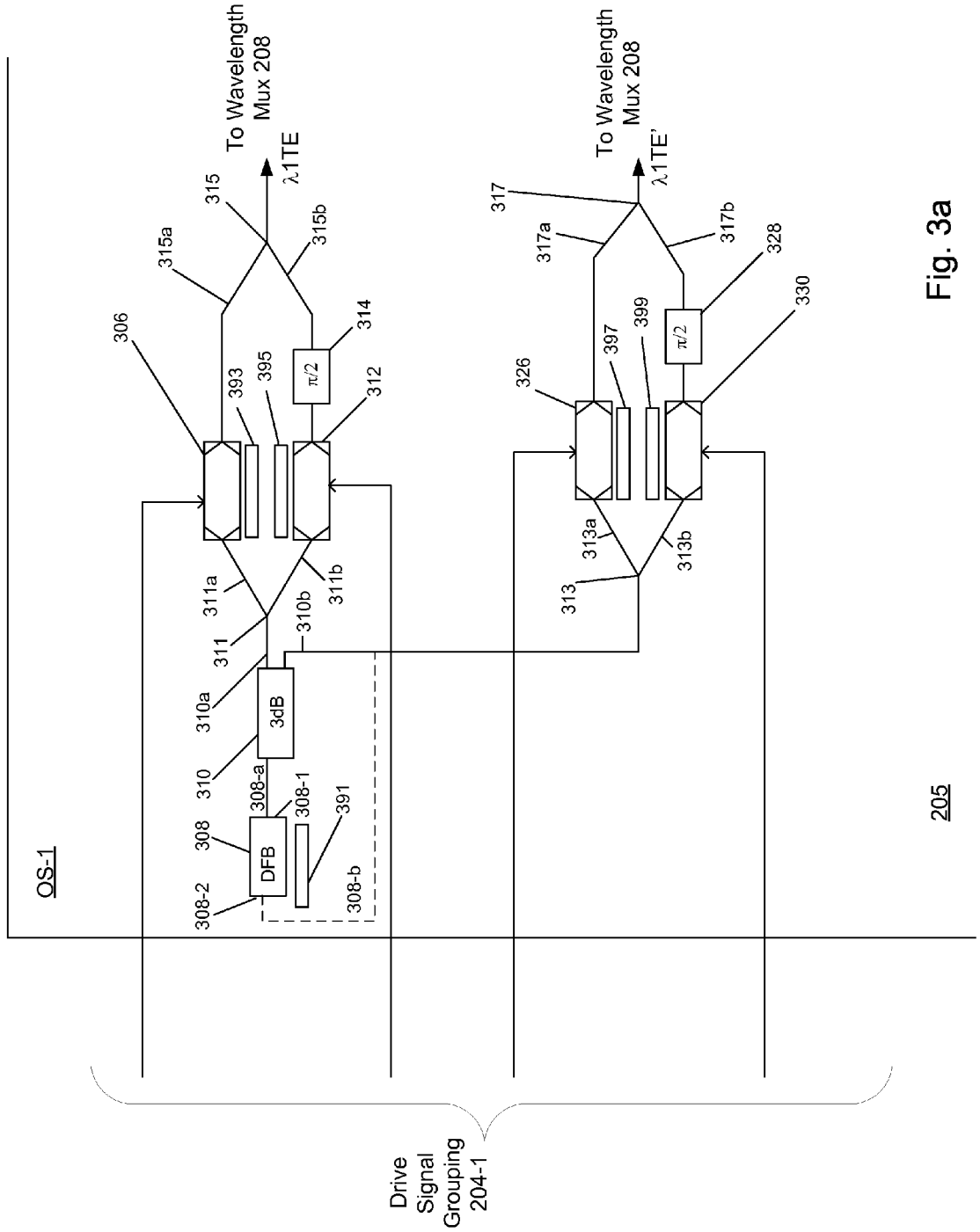
FIG. 3a illustrates an example of an optical source consistent with an additional aspect of the present disclosure.

FIG. 3a illustrates transmitter or optical source OS-1 in greater detail. It is understood that remaining optical sources OS-1 to OS-10 have the same or similar structure as optical source OS-1.

Optical source OS-1 may be provided on substrate 205 and may include a laser 308, such as a distributed feedback laser (DFB), which supplies light to at least four (4) modulators 306, 312, 326 and 330. DFB 308 may output continuous wave (CW) light at wavelength $\lambda$1 to a dual output splitter or coupler 310 (e.g. a 3 db coupler) having an input port and first and second output ports. Typically, the waveguides used to connect the various components of optical source OS-1 may be polarization dependent. A first output 310$a$ of coupler 310 supplies the CW light to first branching unit 311 and the second output 310$b$ supplies the CW light to second branching unit 313. A first output 311$a$ of branching unit 311 is coupled to modulator 306 and a second output 311$b$ is coupled to modulator 312. Similarly, first output 313$a$ is coupled to modulator 326 and second output 313$b$ is coupled to modulator 330. Modulators 306, 312, 326 and 330 may be, for example, Mach Zehnder (MZ) modulators. Each of the MZ modulators receives CW light from DFB 308 and splits the light between two (2) arms or paths. An applied electric field in one or both paths of a MZ modulator creates a change in the refractive index. In one example, if the relative phase between the signals traveling through each path is 180° out of phase, destructive interference results and the signal is blocked. If the signals traveling through each path are in phase, the light may pass through the device and modulated with an associated data stream. The applied electric field may also cause changes in the refractive index such that a phase, as well as the amplitude, of light output from the MZ modulator is shifted or changed relative to light input to the MZ modulator. Thus, appropriate changes in the electric field can cause changes in phase of the light output from the MZ modulator, such that the light output from the modulator complies with phase modulation format, such as QPSK, BPSK or another phase modulation format.

Each of the MZ modulators 306, 312, 326 and 330 are driven with data signals or drive signals associated with drive signal grouping 204-1, for example. The CW light supplied to MZ modulator 306 via DFB 308 and branching unit 311 is modulated in accordance with one such drive signal from grouping 204-1. The modulated optical signal from MZ modulator 306 is supplied to first input 315$a$ of branching unit 315. Similarly, other drive signals of grouping 204-1 drive MZ modulator 312. The CW light supplied to MZ modulator 312 via DFB 308 and branching unit 311 is modulated in accordance with the drive signal supplied by driver circuit 328. The modulated optical signal from MZ modulator 312 is supplied to phase shifter 314 which shifts the phase of the signal 90° (π/2) to generate one of an in-phase (I) or quadrature (Q) components, which is supplied to second input 315b of branching unit 315. The modulated data signals from MZ modulator 306, which includes the other of the I and Q components, and from MZ modulator 312 are supplied as λ1TE to wavelength multiplexing circuitry 208 via branching unit 315.

Further drive signals of grouping 204-1 drive MZ modulator 326 to output modulated optical signals as one of the I and Q components. The CW light supplied from DFB 108 is supplied to MZ modulator 326 via first output 313a of branching unit 313. MZ modulator 326 then modulates the polarization rotated CW light supplied by DFB 308, in accordance with drive signals from driver circuit 330. The modulated optical signal from MZ modulator 326 is supplied to first input 317a of branching unit 317.

An additional drive signal of grouping 204-1 drives MZ modulator 330. The CW light supplied from DFB 308 is also rotated by polarization rotator 324 and is supplied to MZ modulator 330 via second output 313b of branching unit 313. MZ modulator 330 then modulates the received optical signal in accordance with the drive signal supplied by driver 332. The modulated data signal from MZ modulator 330 is supplied to phase shifter 328 which shifts the phase the incoming signal 90° (π/2) and supplies the other of the I and Q components to second input 317b of branching unit 317.

The modulated data signal from MZ modulator 330 is also supplied to branching unit 317, and the combined outputs from MZ modulators 326 and 330 are also supplied to wavelength multiplexing circuitry 208 as optical signal λ1TE'. Both λ1TE and λ1TE' have a TE polarization, but λ1TE', as well as λ2TE' to λ10TE' as part of the second WDM optical output 291 may be polarization rotated to have a TM polarization (to provide optical signals λ1™ to λ10™) prior to be polarization multiplexed in circuitry 295.

As noted above, one DFB laser 108 may provide a CW signal to four separate MZ modulators 306, 312, 326 and 330 for modulating at least four separate optical channels by utilizing phase shifting and polarization rotation of the transmission signals. Alternatively, multiple CW light sources may be used for each channel which increased device complexity, chip real estate, power requirements and associated manufacturing costs.

Alternatively, splitter or coupler 310 may be omitted and DFB 308 may be configured as a dual output laser source to provide CW light to each of the MZ modulators 306, 312, 326 and 330 via branching units 311 and 313. In particular, coupler 310 may be replaced by DFB 308 configured as a back facet output device. Both outputs of DFB laser 308, from respective sides 308-1 and 308-2 of DFB 308, are used, in this example, to realize a dual output signal source. A first output 308a of DFB 308 supplies CW light to branching unit 311 connected to MZ modulators 306 and 312. The back facet or second output 308b of DFB 308 supplies CW light branching unit nit 313 connected to MZ modulators 326 and 330 via path or waveguide 343 (represented as a dashed line in FIG. 5). The dual output configuration provides sufficient power to the respective MZ modulators at a power loss far less than that experienced through 3 dB coupler 310. The CW light supplied from second output 308b is supplied to waveguide 343 which is either coupled directly to branching unit 313 or to polarization rotator 324 disposed between DFB 308 and branching unit 313. Polarization rotator 324 rotates the polarization of CW light supplied from second output 308b of DFB 308 and supplies the rotated light to MZ modulator 326 via first output 313a of branching unit 313 and to MZ modulator 330 via second output 313b of branching unit 313.

The polarization multiplexed output from PBC 338, may be supplied to multiplexer 208 in FIG. 2, along with the polarization multiplexed outputs having wavelength λ2 to λ10 from remaining optical sources OS-2 to OS-10. Multiplexer 208, which, as noted above, may include an AWG 204, supplies a group of optical signals to multiplexer 14 (see FIG. 1). It is understood that PICs present in transmitter blocks 12-2 to 12-n operate in a similar fashion and include similar structure as PIC 206 shown in FIGS. 2 and 3.

Returning to FIG. 1 and as noted above, optical signals output from transmitter block 12-1 are combined with optical signals output from remaining transmitter blocks 12-2 to 12-n by multiplexer 14 onto optical communication path 16. The optical signals, which may collectively constitute a wavelength division multiplexed (WDM) optical signal may be optionally amplified by an amplifier 101, including, for example, a known erbium doped fiber amplifier.

As further shown in FIG. 1, the WDM optical signal may be supplied to a known optical splitter or tap 151, which has an input 151-1. A first output of 151-2 of optical tap 151 supplies a first portion of the WDM optical signal to input 153-1 of optical component 153, and a second output 151-3 supplies a second portion of the WDM optical signal for further propagation along optical communication path 16. Optical component 153, as well as other optical components described herein, may include a microelectromechanical system (MEMS), as described, for example, in U.S. Pat. No. 6,590,697, the entire contents of which are incorporated herein by reference, or other optical device that receives input light and selectively passes such light through an output in response to a control signal, such as an electrical or optical signal. Optical component 153 may include a variable optical attenuator (VOA) or optical modulator. Optical component 153 may also include a known optical switch or an amplitude varying element (AVE), as described below.

During a first mode of operation, in which monitoring of transmitter blocks 12-1 to 12-n is desired, optical component 153 may pass or transmit the first portion of the WDM optical signal to output 153-3, which, in turn, supplies the second portion of the WDM optical signal to first input 155-1 of optical combiner 155. The first portion of the WDM optical signal is supplied from output 155-3 of optical combiner 155, is then optionally amplified by optical amplifier 107, and fed to demultiplexer 44, which may output optical signals having wavelengths λ1 to λ10 to receiver (Rx) block 42-1. Other optical signal groupings have different wavelengths may be output from to other Rx blocks 42-2 to 42-n.

Figure 4:
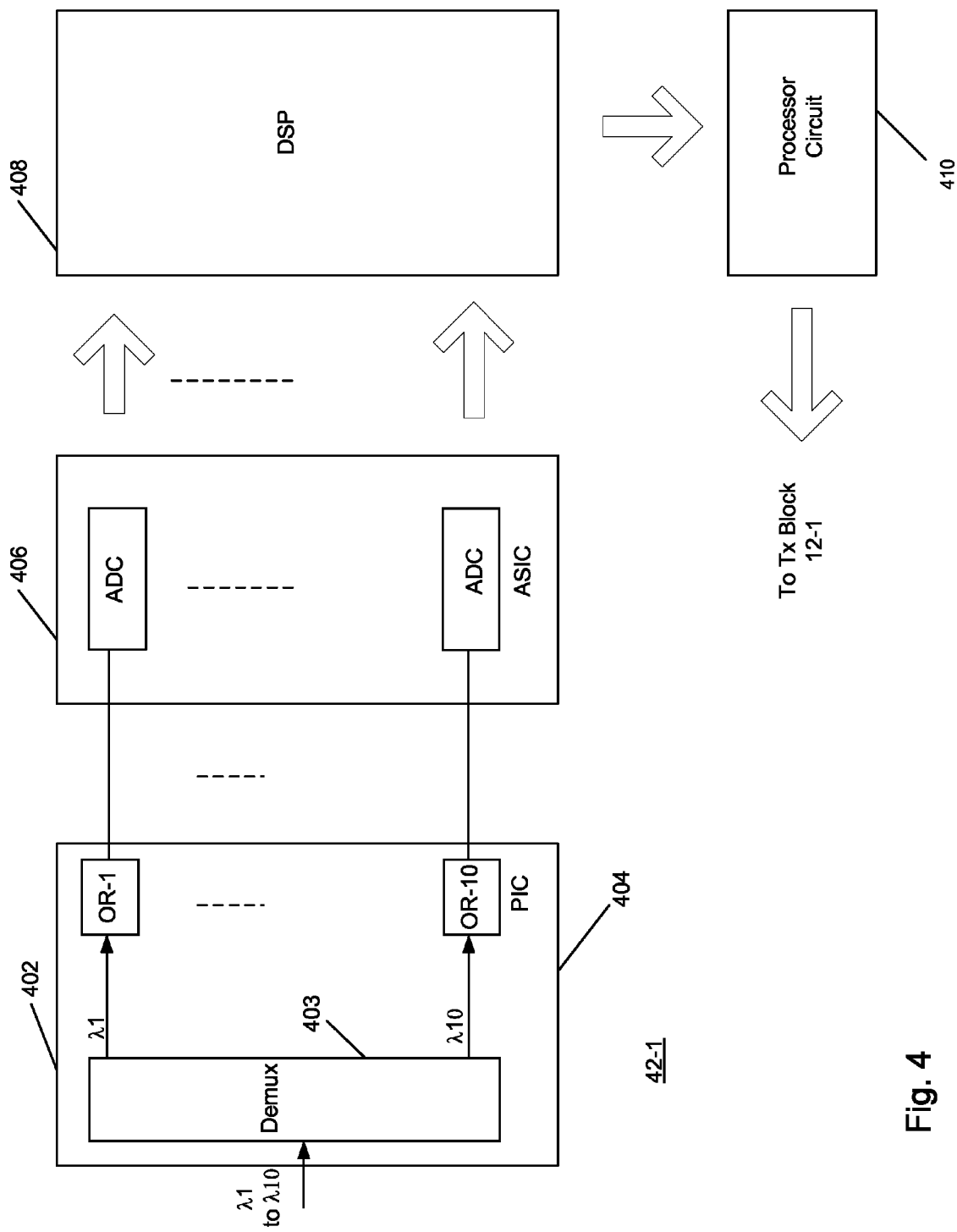
FIG. 4 illustrates an example of a receiver block consistent with an aspect of the present disclosure.

Rx block 42-1 will next be described in greater detail with reference to FIG. 4. It is understood that remaining Rx blocks 42-2 to 42-n have the same or similar structure as Rx block 42-1. In one example, each of Rx blocks 42-1 to 42-n constitute a coherent intradyne receiver.

Receiver block 42-1 may include a receive photonic integrated circuit (PIC) 402 provided on substrate 404. PIC 402 includes a known optical demultiplexer 403, such as a deinterleaver, that has an input that receives the first WDM optical signal portion having wavelengths λ1 to λ10, and supplies each wavelength component of the first WDM optical signal portion to a corresponding one of optical receiver circuits OR-1 to OR-10. Alternatively, demultiplexer 403 may be replaced by a known optical splitter or power splitter to supply a power split part of the first WDM optical signal portion to each of optical receiver circuits OR-1 to OR-10, and the data or information associated with each wavelength may be demodulated or demultiplexed in the electronic domain by circuitry provided in the Rx block 42-1. It is understood that, consistent with the present disclosure, the number of optical signals, and thus the number of wavelengths, is not limited to the specific numbers of optical signals and wavelengths discussed herein. Rather, any appropriate number of optical signals and wavelengths, as well as transmitters and receivers, may be provided in accordance with the present disclosure.

Figure 5:
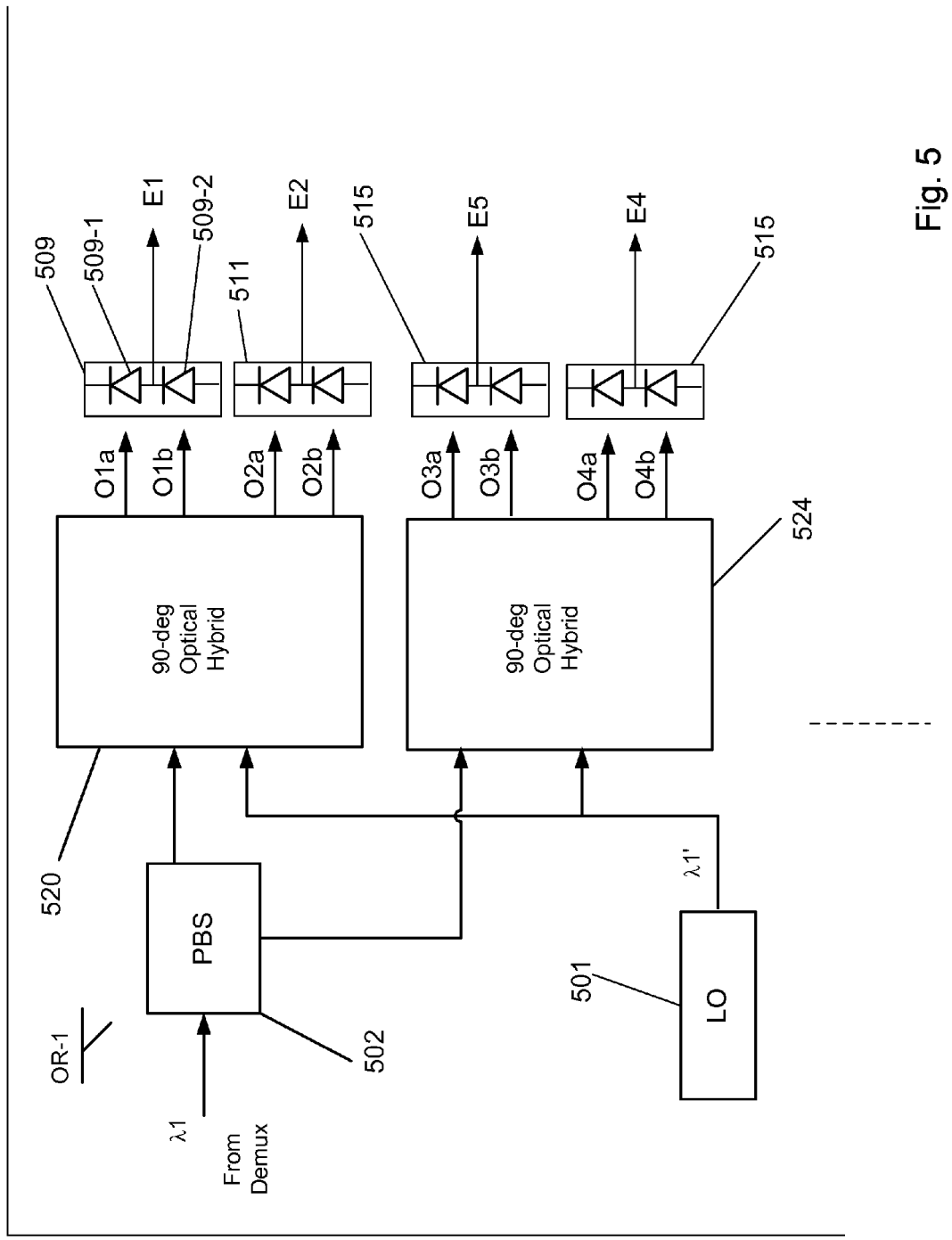
FIG. 5 illustrates part of an optical receiver circuit consistent with the present disclosure.

Optical receiver OR-1 is shown in greater detail in FIG. 5. It is understood that remaining optical receivers OR-2 to OR-10 have the same or similar structure as optical receiver OR-1. Optical receiver OR-1 may include a polarization beam splitter (PBS) 502 operable to receive polarization multiplexed component of the first WDM optical signal portion having wavelength λ1TE and λ1™ and to separate such component into X and Y orthogonal polarizations, i.e., vector components of the optical E-field of the incoming optical signals output from demultiplexer 403 (e.g., λ1TE and λ1™). The orthogonal polarizations are then mixed in 90 degree optical hybrid circuits ("hybrids") 520 and 524 with light from local oscillator (LO) laser 501 having wavelength λ1' which is sufficient to "beat", in a known manner, with both λ1TE and λ1 TM. Hybrid circuit 520 may output four optical signals O1a, O1b, O2a, O2b and hybrid circuit 524 outputs four optical signals O3a, O3b, O4a, and O4b, each representing the in-phase and quadrature components of the optical E-field on X (TE) and Y (TM) polarizations, and each including light from local oscillator 501 and light from polarization beam splitter 502. Optical signals O1a, O1b, O2a, O2b, O3a, O3b, O4a, and O4b are supplied to a respective one of photodetector circuits 509, 511, 513, and 515. Each photodetector circuit includes a pair of photodiodes (such as photodiodes 509-1 and 509-2) configured as a balanced detector, for example, and each photodetector circuit supplies a corresponding one of electrical signals E1, E2, E3, and E4, each of which being an analog electrical signal, for example. Alternatively, each photodetector may include one photodiode (such as photodiode 509-1) or single-ended photodiode.

Analog electrical signals E1 to E4 are indicative of data carried by the component of the first WDM optical signal portion having wavelength λ1 to λ10 input to PBS 502. For example, these electrical signals may comprise four baseband analog electrical signals linearly proportional to the in-phase and quadrature components of the optical E-field on X (TE) and Y TM polarizations, i.e., the information carried by the first light having a first X (TE) polarization and second light carried by the second Y (TM) polarization. Typically, the information constitutes a first series of symbols carried by the first light and a second series of symbols carried by the second light.

Returning to FIG. 4, each optical receiver circuit OR-1 to OR-10 supplies a corresponding grouping of analog electrical signals (such as E1 to E4) to analog-to-digital conversion (ADC) circuits 406. Each analog electrical signal grouping is indicative of data carried by a respective wavelength component of the first WDM optical signal portion. Each ADC circuit may also include known transimpedance amplifier and automatic gain control circuitry to adjust the voltage and/or current of the analog electrical signals.

ADC circuits 406 supply digital samples associated with each analog electrical signal grouping supplied by optical receiver circuits OR-1 to OR-10. These digital samples are then processed by DSP 408, which can determine various parameters associated with each spectral component of the first WDM optical signal portion, such as phase, amplitude, BER and OSNR, in a known manner. DSP 408 may, during the first or monitoring mode of operation, supply signals indicative of these parameters to a control or processor circuit 410, which, in turn, may supply appropriate control signals to one or more parts of Tx blocks 12-1 to 12-n to optimize the performance thereof.

For example, processor circuit 410 may supply control signals to processor and driver circuits or circuitry 202 (see FIG. 2) to adjust the amplitude, phase or other property of one or more of the drive signals included in drive signal groupings 204-1 to 204-10. In addition, control signals output from processor circuit 410 may also be supplied to one or more optical sources OS-1. In one example, control signals may be applied to heater 391 (such as a thin film heater, including platinum, for example) to adjust the temperature and thus the wavelength of light output from DFB laser 508. Alternatively, the control signals may be used to adjust the current through DFB 508. In another example, control signals may be supplied to heaters 393, 395, 397, and 399 to adjust the temperature and thus the refractive index of portions of MZ interferometers 306, 312, 326, and 330, respectively. As a result, the phase and or amplitude or other characteristic of light output from these MZ interferometers may be adjusted to achieve optimal performance. In a further example, such control signals may be used to "balance" the refractive index in each arm of one or more of MZ interferometers, such that the phase of light output from each is at a null in the absence of data and each MZ interferometer has a desired DC extinction ratio. Also, the refractive index in each arm may be "balanced" so that the relative phase between an upper path, including MZ interferometers 306 and 312, and a lower path including MZ interferometers 326 and 330 is in quadrature, e.g., one lags the other by 90 degrees. Such a phase relationship may be required in order to modulate both in-phase and quadrature components of the optical signal to carry data.

Figure 3B:
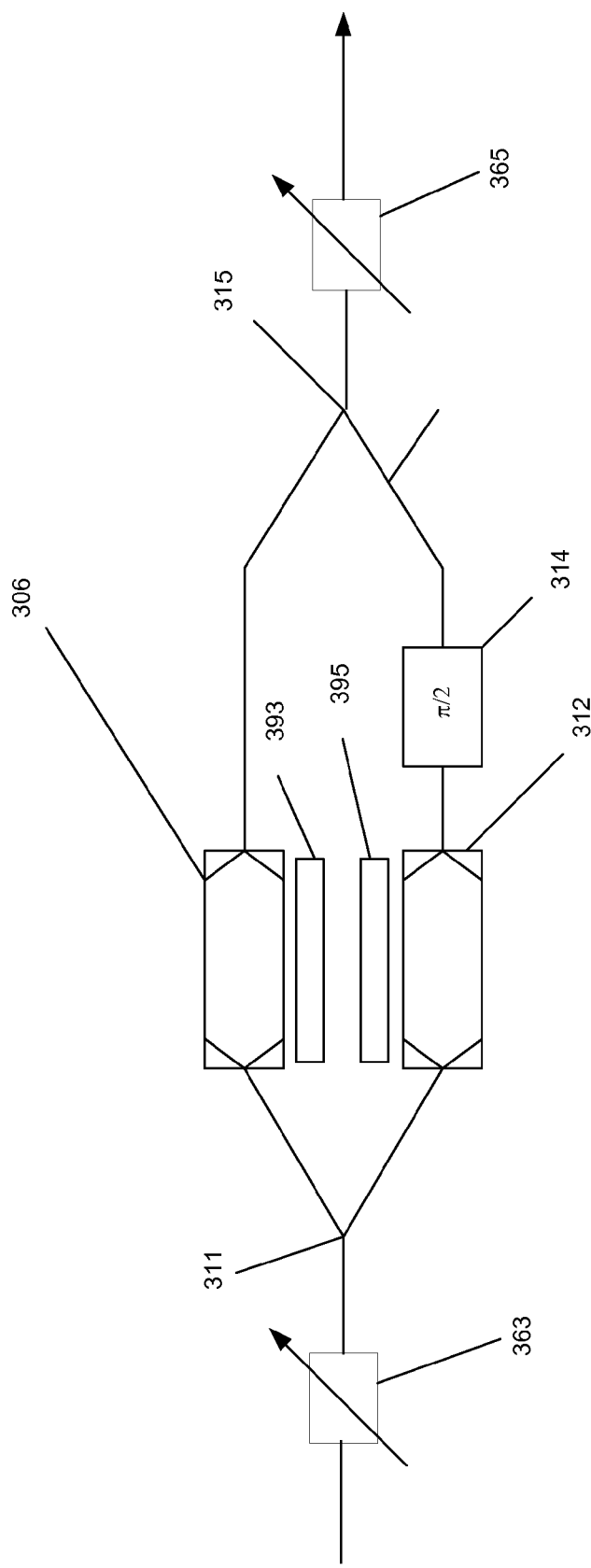
FIG. 3b illustrates a portion of the optical source shown in FIG. 3a in greater detail.

As shown in FIG. 3b, variable gain and/or attenuation elements or amplitude varying elements (AVEs) 363 and 365 may be provided at an input to branching unit 311 and an output of branching unit 315, respectively. Such AVEs may also receive control signals to adjust the power, intensity or amplitude of optical signals input to and output from MZ interferometers 306 and 312. It is understood that AVEs may also be provided in other locations of the optical sources OS and/or on substrate 205, such as in each arm of the MZ interferometers. AVEs consistent with the present disclosure may include variable optical attenuators (VOAs) and semiconductor optical amplifiers (SOAs), for example. AVEs and MZ interferometers may also constitute optical components, as described herein.

In the above-described first mode of operation, the outputs of TX blocks 12-1 to 12-n are monitored and processor circuit 410 (see FIG. 4) supplies feedback or control signals to optimize the performance of these TX blocks. Once Tx blocks 12-1 to 12-n have been optimized, no further monitoring may be necessary, and system 100 may enter a second or normal mode of operation whereby data is transmitted from TX blocks 12-1 to 12-n and carried by a second WDM optical signal downstream along optical communication path 16 to demultiplexer 20. Preferably, optical component 153 blocks or otherwise suppresses a portion of the WDM signal output from multiplexer 14 during the second mode operation so that such WDM signal portion does not reach optical communication path 19 where it can mix or otherwise interfere with incoming optical signals supplied to input 155-2 of optical combiner 155 (see discussion below).

Optical demultiplexer 20 has the same or similar construction as optical demultiplexer 44 and operates in the same or similar fashion to supply optical signal groupings to corresponding ones of Rx blocks 22-1 to 22-n. Rx blocks 22-1 to 22-n have the same or similar structure and operate in the same or similar fashion as Rx block 42-1. Rather, than supply monitoring data or information, however, the DSP in each of Rx blocks 22-1 to 22-n operates to demodulate and perform other processing operations to output data streams Data-1 to Data-n which may be duplicates of corresponding data streams supplied to Tx blocks 12-1 to 12-n.

Returning to FIG. 1, card 38 may also include Tx blocks 32-1 to 32-n that receive data streams Data'-1 to Data'-n. Tx blocks 32-1 to 32-n and multiplexer 30 may have the same or similar structure as Tx block 12-1 and multiplexer 14 and operate in the same or similar fashion to supply groupings of optical signals and multiplex or combine such grouping to supply a third WDM optical signal to optical tap or splitter 157 provided along optical communication path 19.

During the first mode of operation discussed above, the optical signals outputs from Tx blocks 32-1 to 32-n may also be monitored so that these Tx blocks may also be optimized. For example, in a manner similar to that described above with respect to optical tap 151, optical tap 157 supplies a first portion of the third WDM optical signal to optical component 159, which passes the first portion of the third WDM optical signal to optical combiner 161. The first portion of the third WDM optical signal is next output from combiner 161 and fed via optional optical amplifier 103 to demultiplexer 20.

Demultiplexer 20 and Rx blocks 22-1 to 22-1 operation in a similar fashion as demultiplexer 44 and Rx blocks 42-1 to 42-n to provide monitoring data or information to a processor or control circuit in housing 18, for example, that has the same or similar structure as processor circuit 410. Such processor circuitry in housing 18 may provide further control signals to adjust or optimize circuit parts or components in Tx blocks 32-1 to 32-n in a manner similar to or the same as that described above with regard to processor 410. As a result, during the first mode of operation (the monitoring mode), the performance of Tx blocks 32-1 to 32-n may also be optimized so that the optical signals output therefrom have desired parameter values, such as desired BER and OSNR values.

Once optimization is complete, system 100 may enter the second or normal mode of operation, as noted above. Thus, in addition, to optical signals or data traffic propagation from housing 11 to housing 18 along optical communication path 16, additional optical signals or data traffic may also propagate from housing 18 along optical communication path 19 (including optical amplifiers 107, 109, and 163) to housing 100, where such signals are demultiplexed by demultiplexer 44 and processed by Rx blocks 42-1 to 42-n in a manner similar to that described above to output copies of data streams Data'-1 to Data'-n that were input to Tx blocks 32-1 to 32-n.

As further noted above, during the second or normal mode of operation, optical component 153 suppresses or blocks light output from tap 151 from reaching input 155-1 of combiner 155 so that such light does not interfere with a fourth WDM signal propagating on optical communication path 19 during the normal mode of operation. Likewise, optical component 159 blocks light supplied from splitter 157 from reaching combiner 161 so that such light does not interfere with the second WDM signal propagating along optical communication path 16 during the normal mode of operation.

Figure 6:
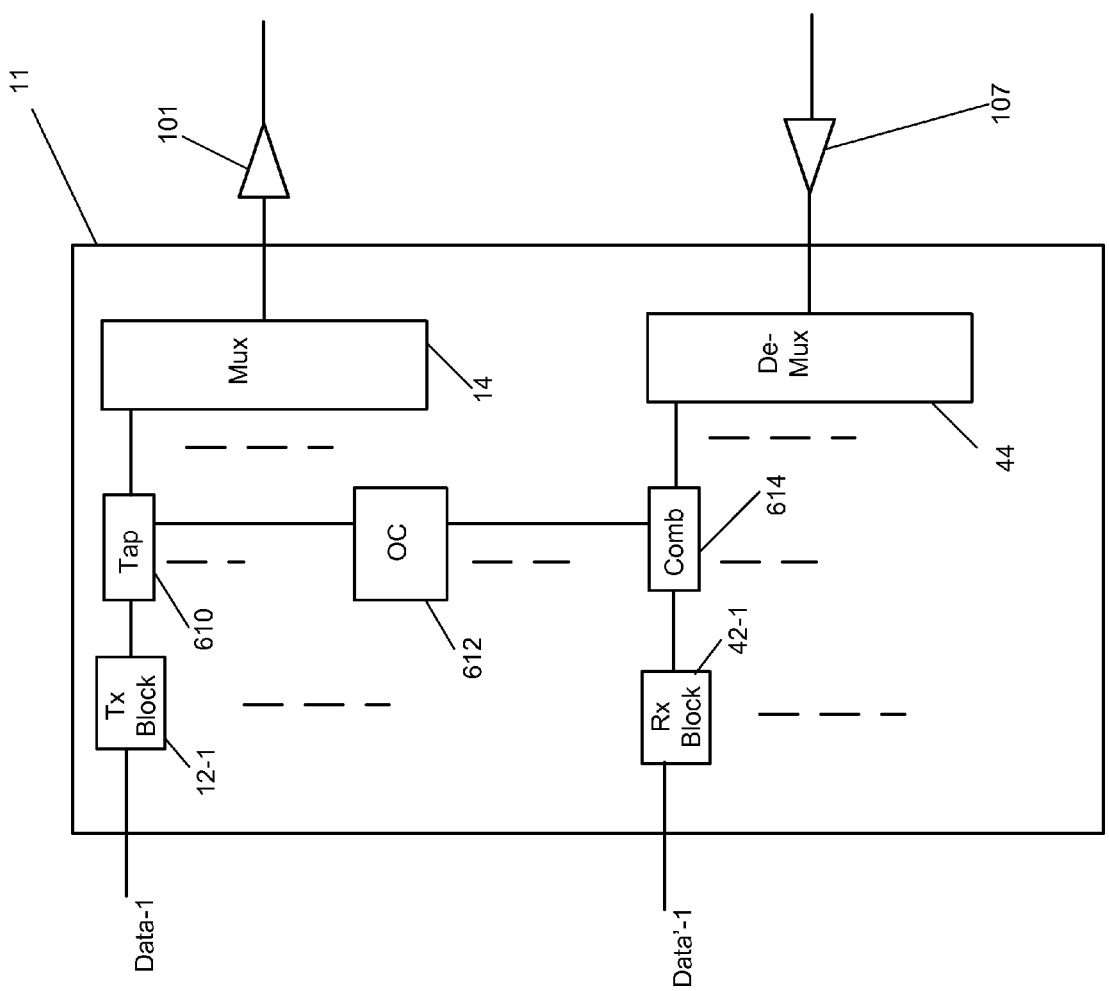
FIG. 6 illustrates a block diagram of part of an alternative optical communication system consistent with an aspect of the present disclosure.

FIG. 6 illustrates an alternative embodiment in which a splitter or tap, optical component, and combiner is provided for each Tx block, such as Tx-block 12-1. In the example shown in FIG. 6, tap 610 receives an output from Tx block 12-1, but not the outputs from remaining Tx blocks 12-2 to 12-n. Optical component 612 and combiner 614 operate in the same or similar manner as optical component 153 and combiner 155 to supply a power split portion ("loopback") of the optical signals output from Tx block 12-1 during the first ("monitoring") mode to Rx block 42-1, which may include processor 410 to optimize Tx block 12-1 as described above. During the second or normal mode of operation, optical component 612 may block or suppress the optical signal portion output from tap 610 from reaching combiner 614.

Additional taps, optical components and combiners may be provided for each remaining Tx block to provide selective loopback of optical signals outputs therefrom in order that the remaining Tx blocks may be optimized as well. Although FIG. 6 illustrates taps, optical components and combiners provided in housing 11, it is understood that the same or similar structure may also be provided in housing 18 to provide loopback during optimization of Tx blocks 22-1 to 22-n.

Figure 7:
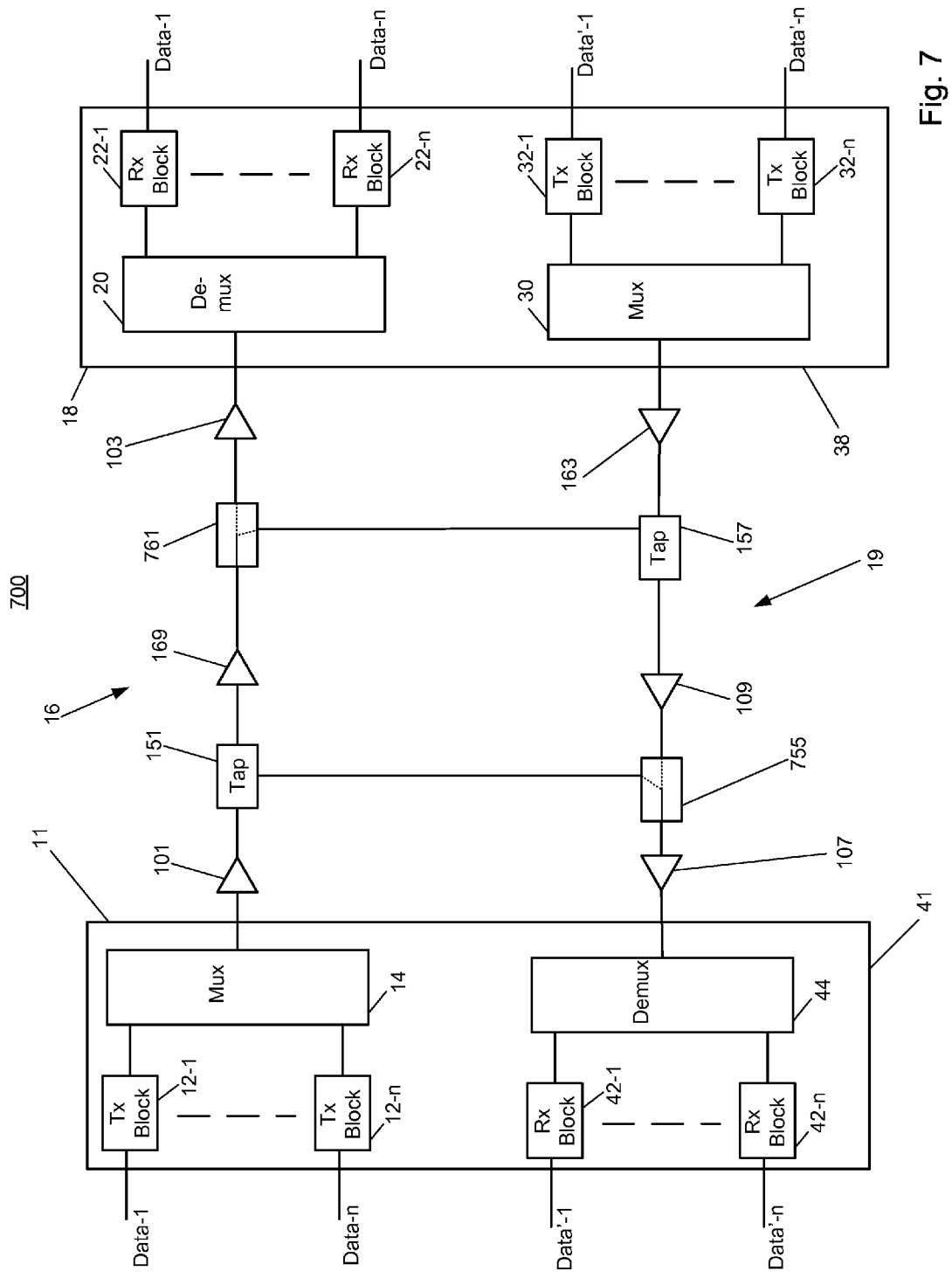
FIG. 7 illustrates a block diagram of an optional optical communication system consistent with an aspect of the present disclosure.

FIG. 7 illustrates optical communication system 700, which is similar to optical communication system 700 discussed above. In optical communication system 700, however, optical component 153 and combiner 155 are replaced by optical switch 755, such as a 2×1 optical switch. In addition, optical component 159 and combiner 161 are replaced by optical switch 761.

During the first (monitoring) mode of operation, switch 755 (an example of an optical component) is configured to provide loopback of a portion of the WDM optical signal output from tap 151 to demultiplexer 44 for further processing and optimization, as discussed above. Moreover, optical switch 761, such as a 1×2 optical switch, is configured to provide loopback of a portion of the WDM optical signal output from tap 157 to demultiplexer 20 for further processing and optimization. After such optimization is complete, switches 755 and 761 may be further configured to pass WDM optical signals propagating on optical communication paths 16 and 19, respectively, for further processing and data output from Rx blocks 42-1 to 421-n and Rx blocks 22-1 to 22-n, as discussed above.

Figure 8:
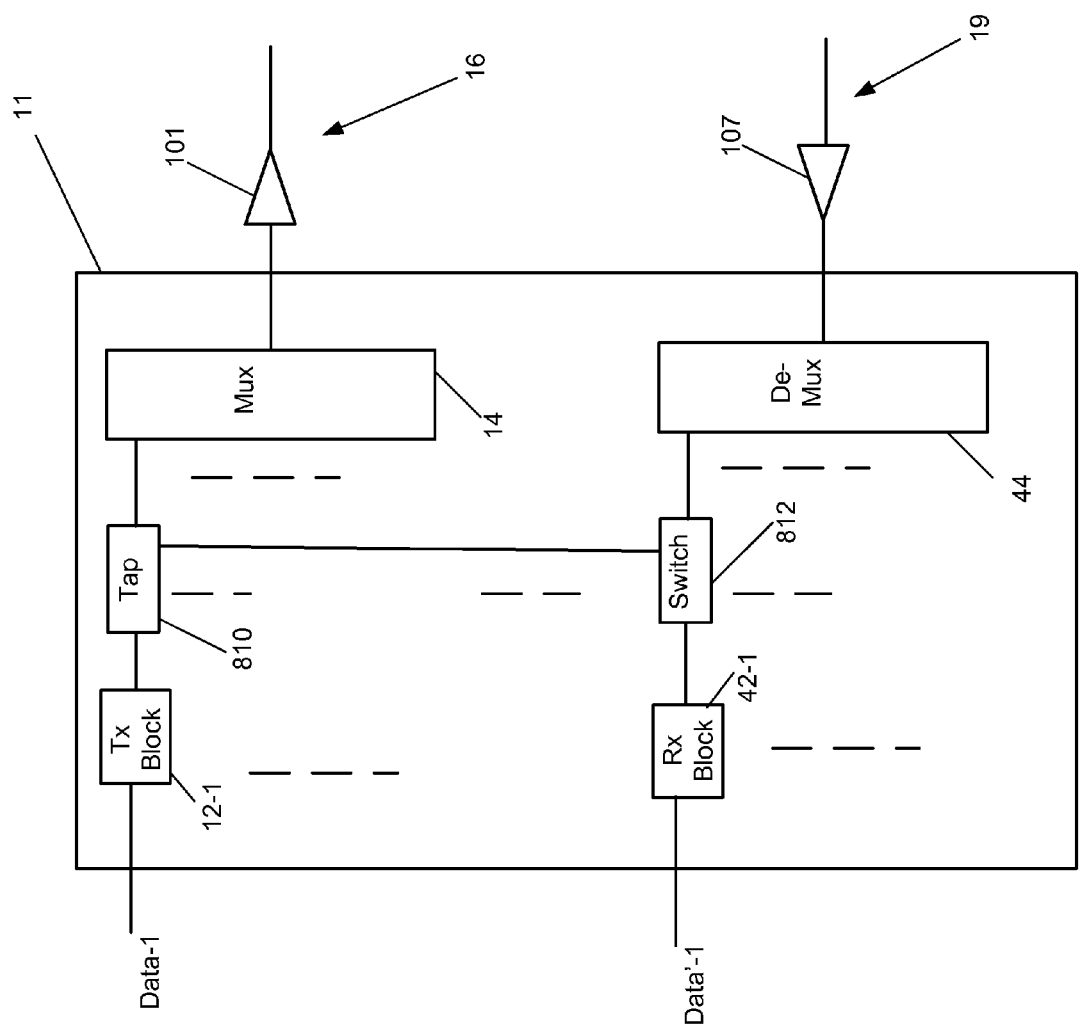
FIG. 8 illustrates a block diagram of an exemplary optical communication system consistent with a further aspect of the present disclosure.

FIG. 8 illustrates a further embodiment in which each of a plurality of taps, such as tap 810, is provided for a respective Tx block, such as Tx block 12-1. Each such tap supplies a power split portion of the optical signal output from a corresponding Tx block to a corresponding one of optical switches, such as optical switch 812. During the monitoring mode of operation, such optical switches (e.g., optical switch 812) are configured to provide loop back of the power split portion of each Tx block to a corresponding one of the Rx blocks, such as Rs block 42-1 shown in FIG. 8. During normal operation, however, optical signal groupings are demultiplexed by demultiplexer 44, as noted above, and passed through corresponding switches to corresponding Rx blocks for further processing and output of data streams Data'-1 to Data'-n, as discussed above.

Figure 9A:
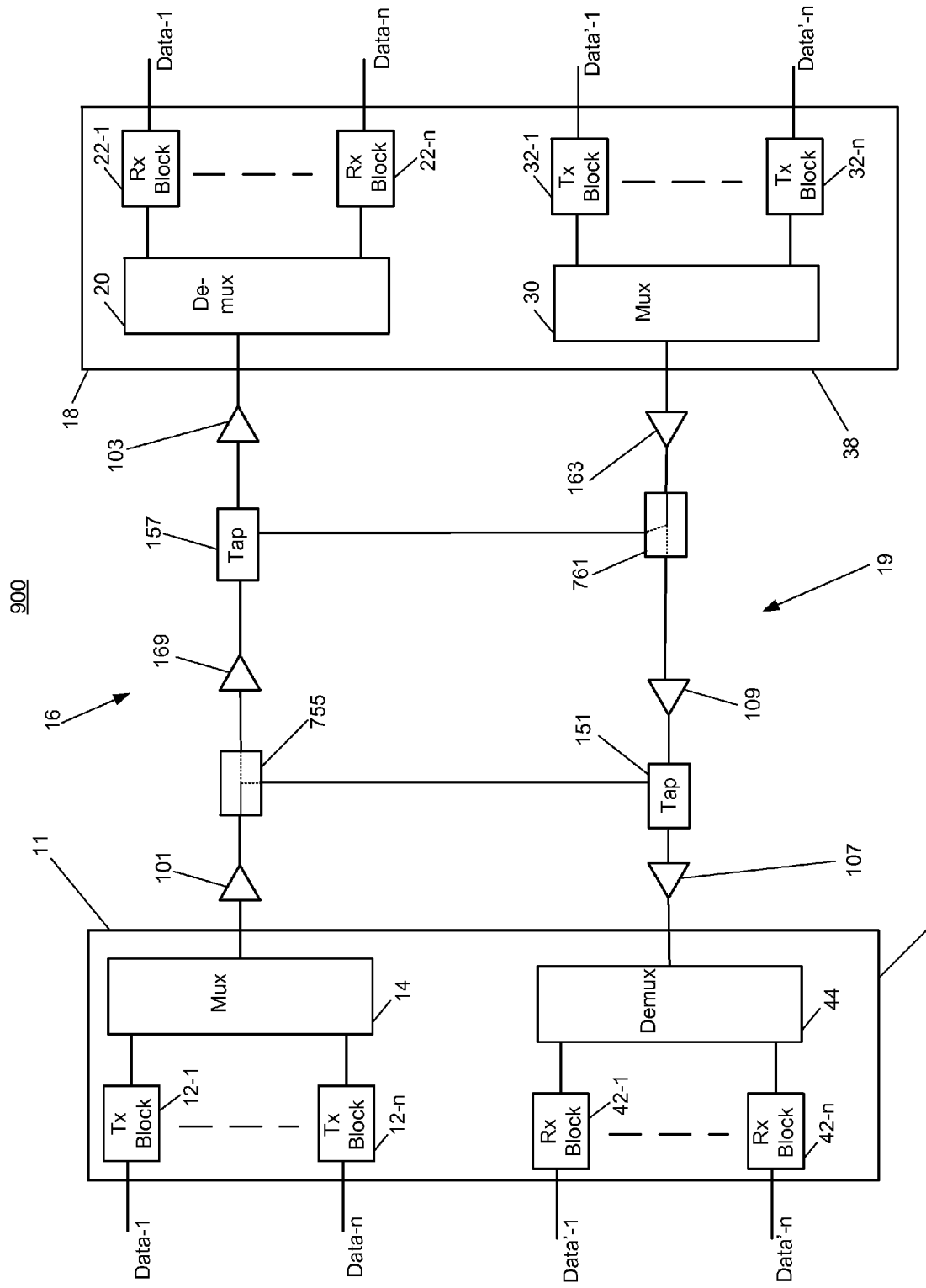
FIGS. 9a and 9b illustrate block diagrams of an additional exemplary optical communication systems consistent with the present disclosure.

FIG. 9a illustrates optical communication system 900 that has a similar structure as that discussed above with reference to FIG. 7. In system 900, however, the locations of tap 151 and optical switch 755 are reversed, such that switch 755 is provided in optical communication path 16 and tap 151 is provided in optical communication path 19. In addition, the locations of tap 157 and switch 761 are reversed, such that switch 761 is provided in optical communication path 19 and tap 157 is provided in optical communication path 157. The loop-back operation of switch 755 and tap 151, as well as switch 761 and tap 157, in FIG. 9a is similar to that discussed above in connection with FIG. 7.

Figure 9B:
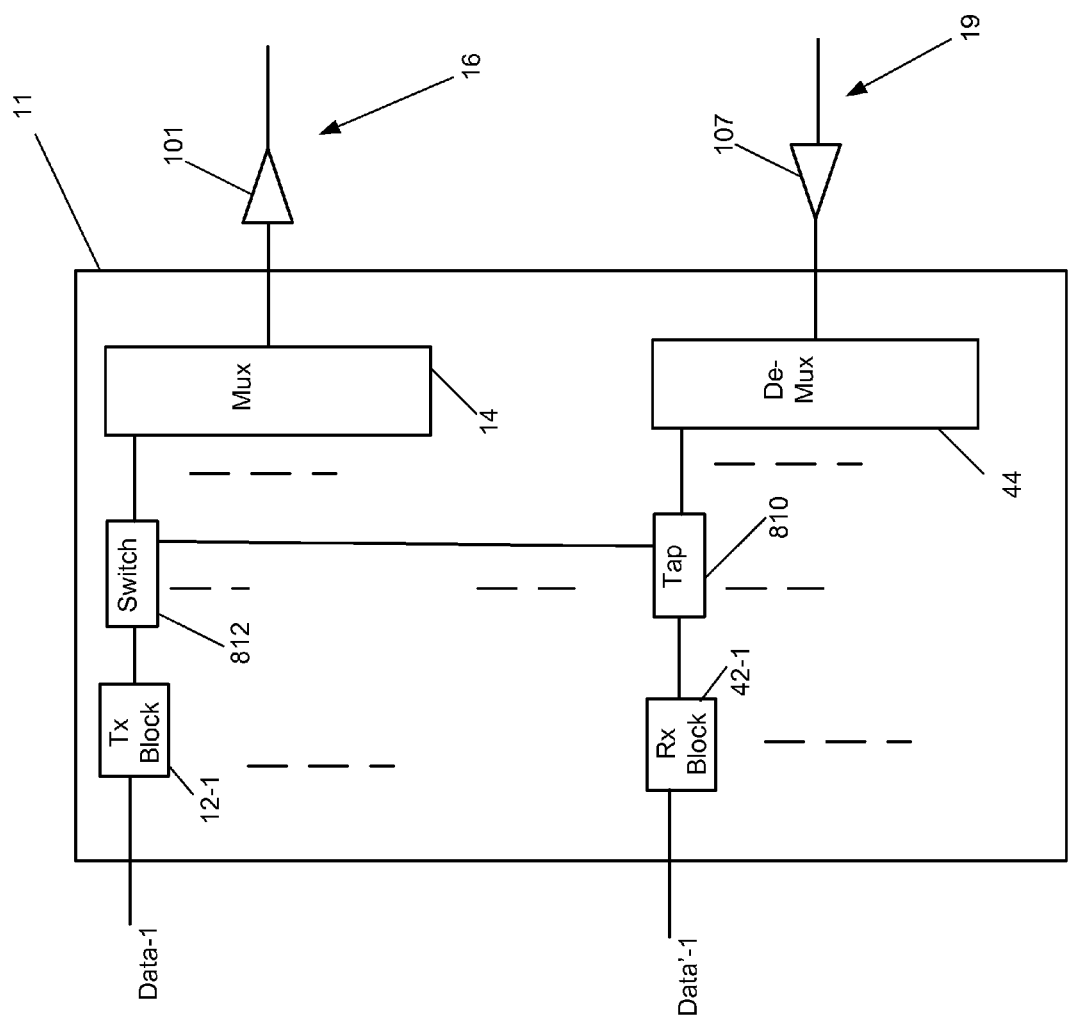

FIG. 9b illustrates and embodiment similar to that shown in FIG. 8. In FIG. 9b, however, the locations of the switches and taps are reversed compared to that shown in FIG. 8. For example, in FIG. 9b, a switch is coupled to each of Tx blocks 12, such as switch 812, which is coupled to Tx block 12-1. In addition, a tap is coupled to each of Rx blocks 42, such as tap 810, which is coupled to Rx block 42-1. Otherwise, the loopback operation of the taps and switches in the embodiment shown in FIG. 9b is similar to that shown in FIG. 8.

Figure 10A:
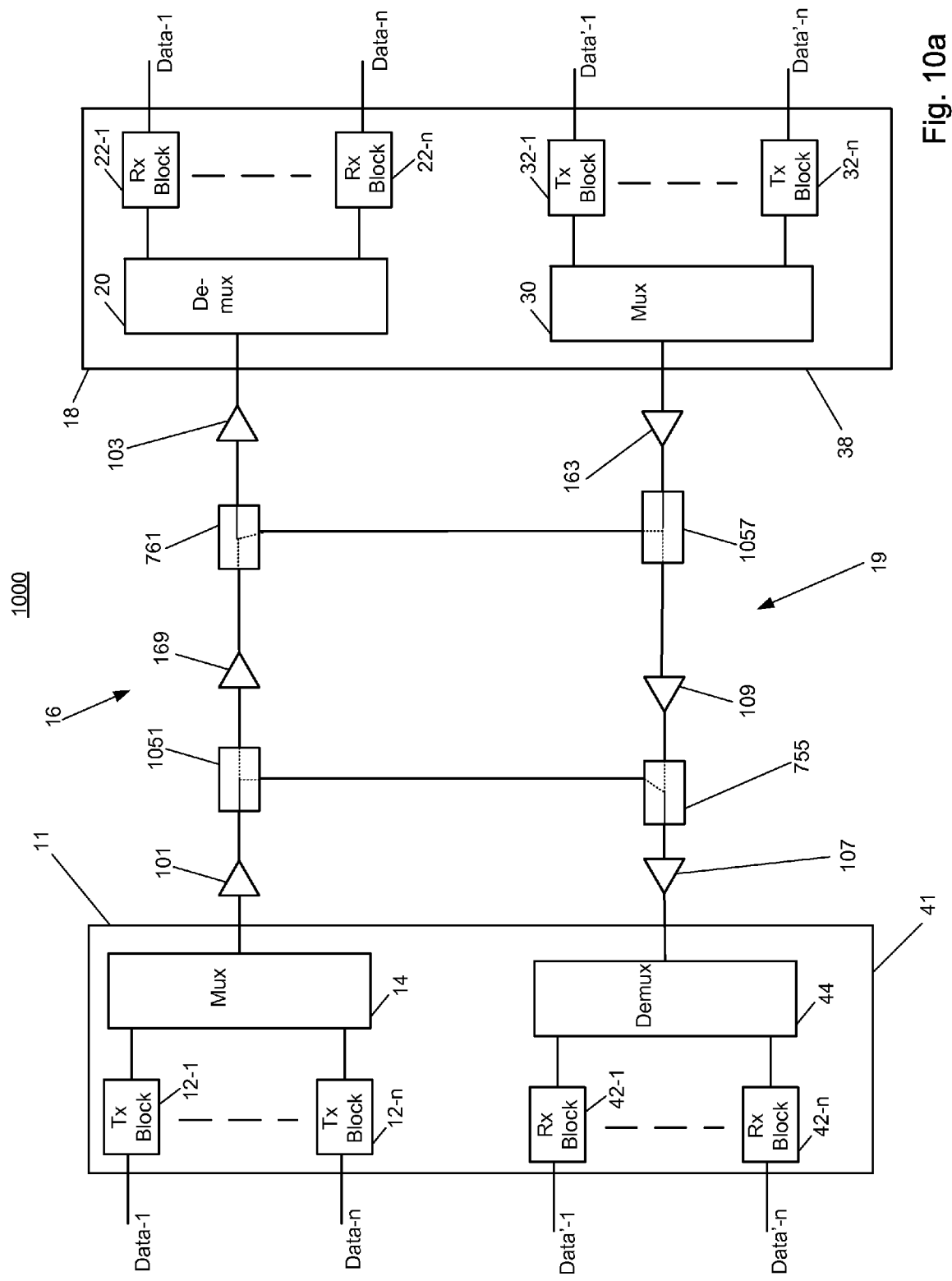
FIGS. 10a and 10b illustrates block diagrams of further optical communication systems consistent with aspects of the present disclosure.

FIG. 10a shows optical communication system 1000 consistent with a further aspect of the present disclosure. Optical communication system 1000 is also similar to optical communication system 700. In optical communication system 1000, however, optical switch 1051 replaces tap 751. Accordingly, in loopback mode, switch 1051 supplies the entire WDM signal output from amplifier 101, for example, to switch 755, which directs the WDM optical signal towards demultiplexer 44 via amplifier 107 in a manner similar to that described above. In addition, during the loop back mode, optical switch 1057 directs the output from optical amplifier 163 to optical switch 761, which, as noted above, supplies the received optical signal back toward demultiplexer 20 via optical amplifier 103. During a normal mode of operation, however, switches 1051 and 761 are configured to pass optical signals along optical communication path 16 from housing 11 to housing 18. Likewise, during the normal mode, optical switches 755 and 1057 are configured to pass optical signals along optical communication path 19 from housing 18 to housing 11.

Figure 10B:
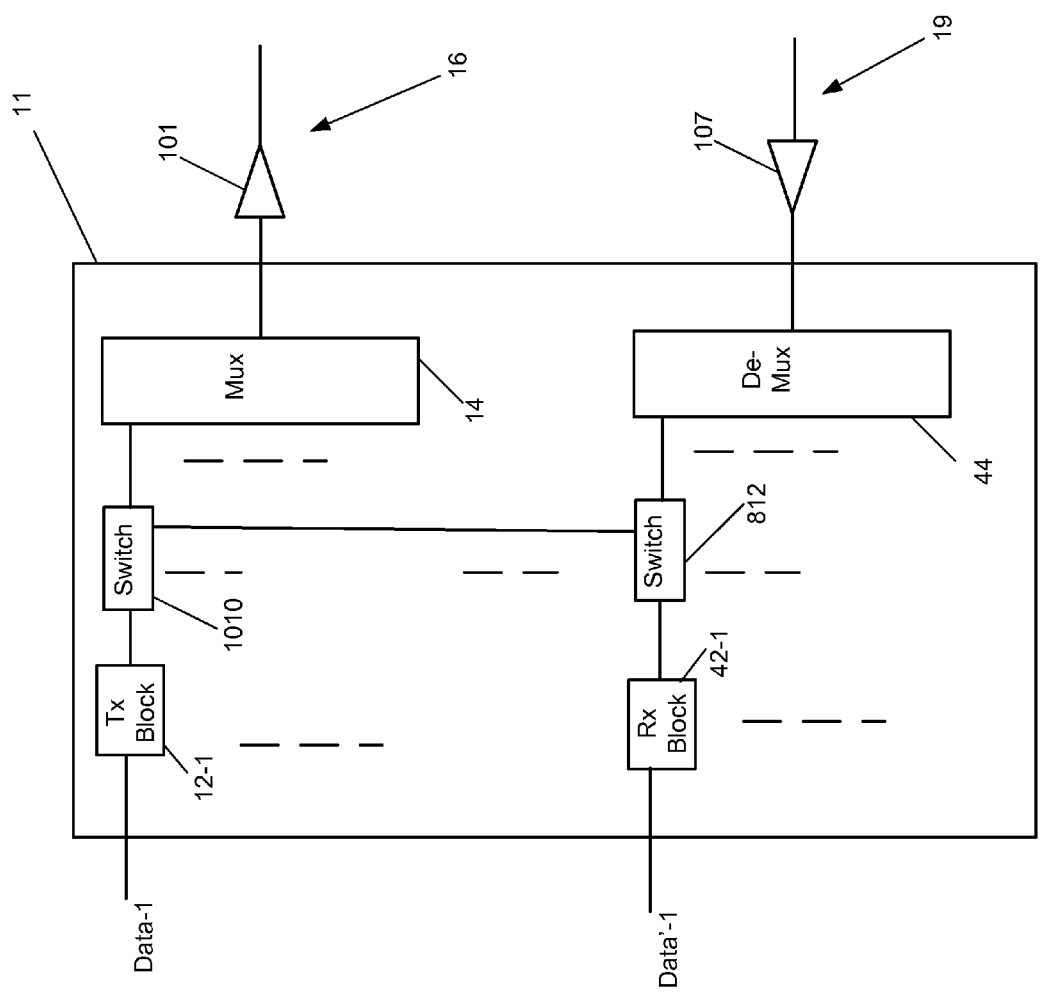

FIG. 10b illustrates and embodiment similar to that shown in FIG. 8. In FIG. 10b, however, each tap is replaced by an optical switch. For example, in FIG. 10b, a switch is coupled to each of Tx blocks 12, such as switch 1012, which is coupled to Tx block 12-1. During loopback, the switches coupled to each of the Tx blocks directs the output optical signals to a corresponding switch that is coupled to a respective Rx block. For example, during loopback, switch 1012 directs optical signals output from Tx block 12-1 to switch 812, which, in turn, supplies the optical signals to Rx block 42-1. During the normal mode of operation, the switches coupled to the Tx blocks 12 pass the optical signals to optical communication path 16 for further propagation to housing 18. For example, switch 1012 passes optical signal output from Tx block 12-1 to optical communication path optical communication path 16 via multiplexer 14, for example. In addition, optical switches coupled to Rx blocks 42 pass demultiplexed optical signals output from demultiplexer 44 to corresponding Rx blocks 42. For example, switch 812 may be configured to pass optical signals from optical communication path, via demultiplexer 44, to Rx block 42-1.

Figure 11:
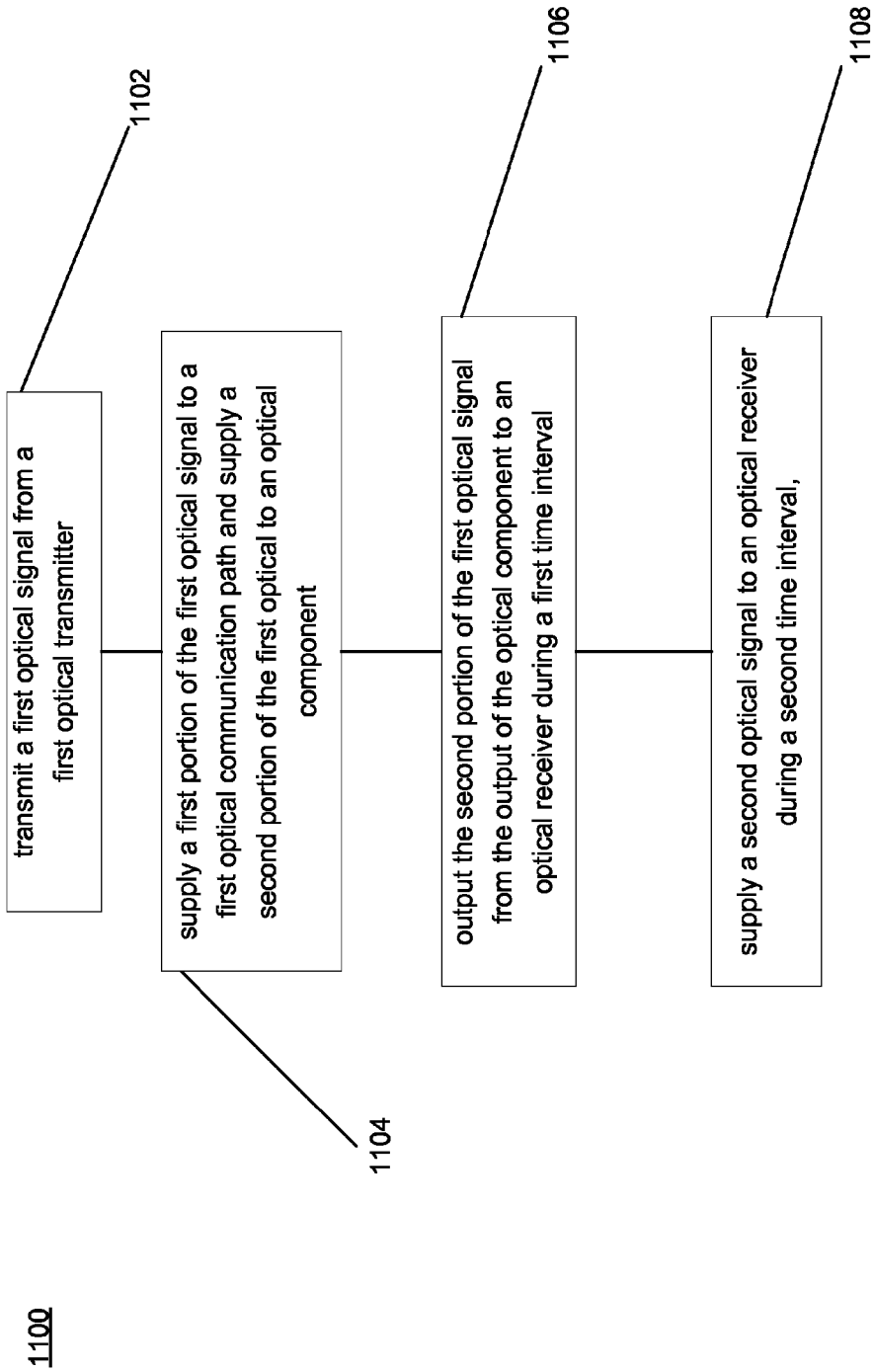
FIG. 11 illustrates a flowchart of a method consistent with an additional aspect of the present disclosure.

FIG. 11 shows a flowchart 1100 of a method consistent with an additional aspect of the present disclosure. In a first step 1102, a first optical signal, such as one or more optical signals output from Tx block 12-1, is transmitted on optical communication path 16. Tap 151 supplies a first portion of the optical signal to optical communication path 16 and a second portion of the optical signal to optical component 153, for example (or optical switch 755 shown in FIG. 7, step 1104). During a first time interval during which the optical system 100 (or 700) is in the monitoring mode, the second portion of the optical signal output from Tx block 12-1 is next fed to Rx block 42-1 (a receiver, for example) via combiner 155, and demultiplexer 44 (step 1106). During the normal mode of operation, i.e., during a second time interval, a second optical signal output from multiplexer 30 is transmitted on optical communication path 19 to housing 11. During the normal mode of operation, the second portion of the first optical signal output from tap 151 is blocked by optical component 153 and is not supplied to the optical receiver (e.g., receiver block 42-1) during the normal mode of operation (the "second time interval", step 1108).

It is noted that the equipment and/or circuitry associated with or in housing 18 may be in a loopback mode during a time interval that does not coincide with a time interval during which the equipment or circuitry associated with or in housing 11 is in a loopback mode, so that such loopback modes occur during different time intervals. Similarly, the normal mode of operation of the circuitry in housing 11 may occur during a different time interval than that of the circuitry in housing 18, so that that such normal modes of operation occur during different time intervals.

As noted above, consistent with the present disclosure both sets of Tx blocks 12-1 to 12-n as well as Tx blocks 32-1 to 32-n may be optimized during a first mode of operation using corresponding co-located Rx blocks. The Rx blocks may then receive optical signal carrying data traffic during a normal mode of operation once such optimization is complete. No dedicated receiver is required.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
a first optical transmitter transmitting a first optical signal;
an optical switch having an input that receives the first optical signal, and first and second outputs, the optical switch selectively supplying the first optical signal to one of the first and second outputs, the first output being coupled to a first optical communication path;
an optical combiner having first and second inputs and an output, the first input of the optical combiner being coupled to the second output of the optical switch and the second input of the optical combiner being coupled to a second optical communication path,
an optical receiver configured to receive the optical signal from the output of the optical combiner when optical signal is supplied from the second output of the optical switch to the first input of the optical combiner; and
a second optical transmitter supplying a second optical signal to the second optical communication path, the second optical signal being supplied to the second input of the optical combiner via the second optical communication path, such that the output of the optical combiner supplies the second optical signal to the optical receiver when the optical switch does not supply the first optical signal to the first input of the optical combiner,
wherein the optical receiver includes a digital signal processor configured to supply an output signal indicative of a phase and amplitude of the first optical signal, the apparatus further including:
a processor circuit configured to supply a control signal in response to the output signal from the digital signal processor, the first optical transmitter receiving the control signal, such that the phase and the amplitude of the first optical signal is adjusted in response to the control signal.

2. An apparatus in accordance with claim 1, wherein the first optical signal is one of a plurality of first optical signals, and the second optical signal is one of a plurality of second optical signals, the first transmitter is one of a plurality of first optical transmitters, each of which supplying a corresponding one of the plurality of first optical signals, each of the plurality of first optical signals having a corresponding one of a plurality of first wavelengths, such that the first optical communication path carries a first wavelength division multiplexed (WDM) optical signal, and the second transmitter is one of a plurality of second transmitters, each of which supplying a corresponding one of the plurality of second optical signals, each of the second plurality of optical signals having a corresponding one of a plurality of second wavelengths.

3. An apparatus in accordance with claim 2, wherein the each of the plurality of first wavelengths is equal to a corresponding one of the plurality of second wavelengths.

4. An apparatus in accordance with claim 1, further including:
  a processor circuit configured to supply a control signal indicative of a parameter associated with the first optical signal, the control signal being supplied in response to an output from the optical receiver, the output from the optical receiver being in response to the second portion of the first optical signal; and
  a component provided in the first optical transmitter, an output of the component being adjusted in response to the control signal.

5. An apparatus in accordance with claim 1, further including an optical multiplexer that receives the first optical signal, the optical multiplexer having an output that supplies a wavelength division multiplexed (WDM) optical signal to the first optical communication path, the WDM optical signal including the first optical signal, the optical switch being coupled to the output of the optical multiplexer.

6. An apparatus, comprising:
  a first optical transmitter transmitting a first optical signal;
  a first optical switch having an input that receives the first optical signal, and first and second outputs, the optical switch selectively supplying the first optical signal to one of the first and second outputs, the first output being coupled to a first optical communication path;
  a second optical switch having first and second inputs and an output, the first input of the second optical switch being coupled to the second output of the first optical switch and the second input of the second optical switch being coupled to a second optical communication path,
  an optical receiver configured to receive the first optical signal from the output of the second optical switch when the first optical signal is supplied from the second output of the first optical switch to the first input of the second optical switch;
  a second optical transmitter supplying a second optical signal to the second optical communication path, such that the output of the second optical switch supplies the second optical signal to the optical receiver when the first optical switch does not supply the first optical signal to the first input of the second optical switch,
  Wherein the first optical receiver includes a digital signal processor configured to supply an output signal indicative of a phase and amplitude of the first optical signal, the apparatus further including
  a processor circuit configured to supply a control signal in response to the output signal from the digital signal processor, the first optical transmitter receiving the control signal, such that the phase and the amplitude of the first optical signal is adjusted in response to the control signal.

7. An apparatus in accordance with claim 6, wherein the first optical signal is one of a plurality of first optical signals, and the second optical signal is one of a plurality of second optical signals, the first transmitter is one of a plurality of first optical transmitters, each of which supplying a corresponding one of the plurality of first optical signals, each of the plurality of first optical signals having a corresponding one of a plurality of first wavelengths, such that the first optical communication path carries a first wavelength division multiplexed (WDM) optical signal, and the second transmitter is one of a plurality of second transmitters, each of which supplying a corresponding one of the plurality of second optical signals, each of the second plurality of optical signals having a corresponding one of a plurality of second wavelengths.

8. An apparatus in accordance with claim 7, wherein the each of the plurality of first wavelengths is equal to a corresponding one of the plurality of second wavelengths.

9. An apparatus in accordance with claim 6, further including:
  a processor circuit configured to supply a control signal indicative of a parameter associated with the first optical signal, the control signal being supplied in response to an output from the optical receiver, the output from the optical receiver being in response to the second portion of the first optical signal; and
  a component provided in the first optical transmitter, an output of the component being adjusted in response to the control signal.

10. An apparatus in accordance with claim 6, further including an optical multiplexer that receives the first optical signal, the optical multiplexer having an output that supplies a wavelength division multiplexed (WDM) optical signal to the first optical communication path, the WDM optical signal including the first optical signal, the first optical switch being coupled to the output of the optical multiplexer.

* * * * *